Figure 2:
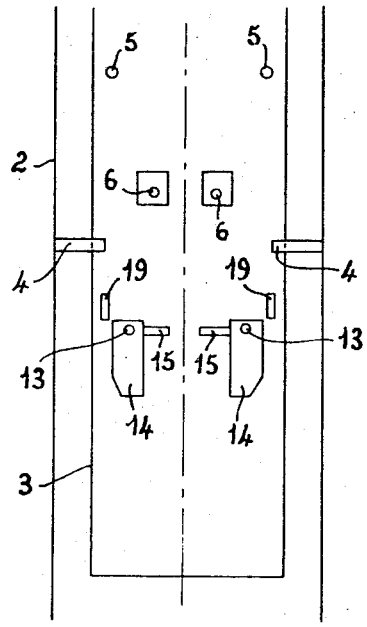

Jan. 2, 1968  P. DURAND  3,361,456
AUTOMATIC LOCKING SYSTEM FOR TELESCOPIC TOWERS
Filed Oct. 24, 1965  2 Sheets-Sheet 1
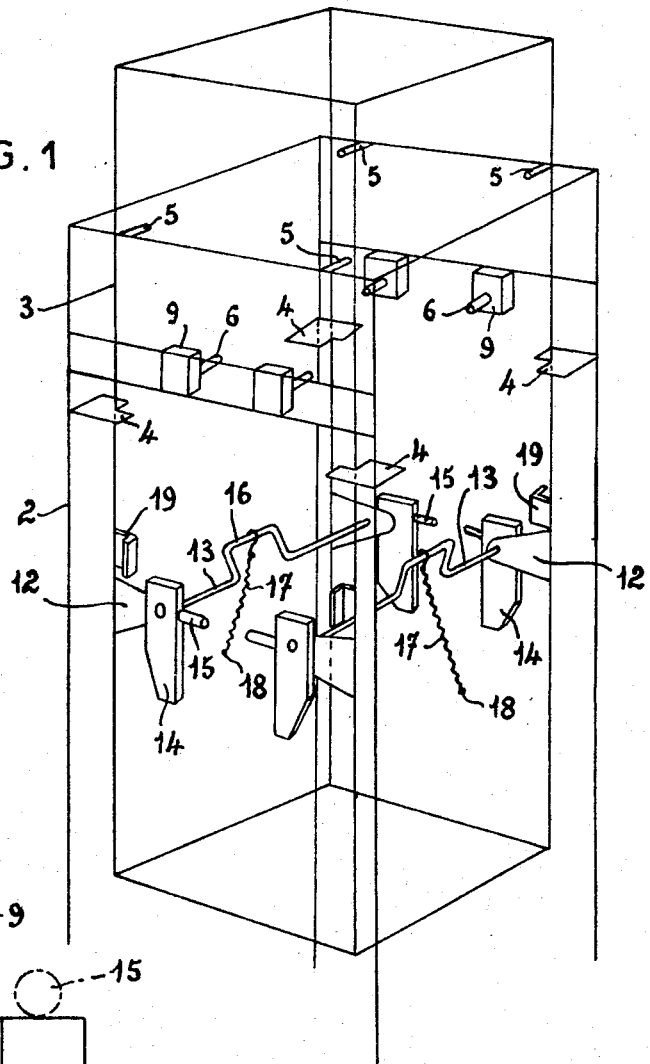
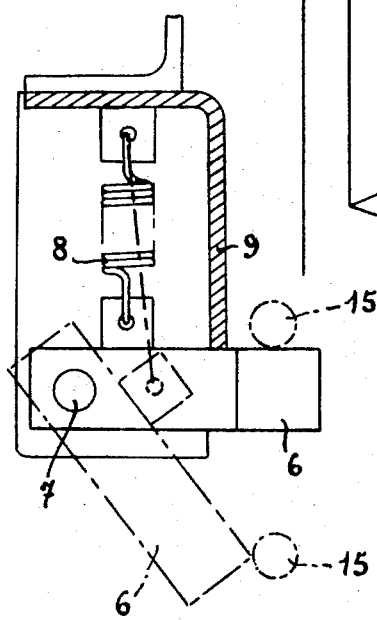
INVENTOR
PIERRE DURAND
BY Young + Thompson
ATTORNEYS Jan. 2, 1968 P. DURAND 3,361,456
AUTOMATIC LOCKING SYSTEM FOR TELESCOPIC TOWERS
Filed Oct. 24, 1965 2 Sheets-Sheet 2

INVENTOR
PIERRE DURAND
BY *Young + Thompson*
ATTORNEYS

United States Patent Office 3,361,456
Patented Jan. 2, 1968

3,361,456
AUTOMATIC LOCKING SYSTEM FOR
TELESCOPIC TOWERS
Pierre Durand, Lyons, France, assignor to RICHIER
(Societe Anonyme), Paris, France
Filed Oct. 24, 1965, Ser. No. 504,452
Claims priority, application France, Apr. 12, 1965,
45,872, Patent 1,440,796
3 Claims. (Cl. 287—58)

My invention has for its object an automatic locking system for a telescopic tower, chiefly a crane tower.

For such applications, there exist already systems for locking various sections of a crane tower with reference to each other. Such prior arrangements include generally supporting arms, hooks and/or bolts of which it is however necessary to control by hand the collapsing or receding movement with a view to increasing or reducing the height of the tower.

My invention has for its object an automatic system locking two telescopic sections of a tower, through which system it is possible to reduce or to increase the height of the tower without it being necsesary to proceed with tedious locking and releasing operations since the mere sliding of the inner section inside the outer section produces automatically the desired locking and the release required.

To this end, the inner section of the tower carries, on the one hand, at least one supporting arm which is pivotally secured round a horizontal axis and is subjected to the action of at least one spring urging it into a horizontal position or a vertical position and holding it in said position as soon as it has passed beyond a medial sloping position and, on the other hand, a stop engaged by said arm when in a horizontal position. The outer section of the tower includes, on the one hand, at least one shoe or bearing surface which serves as a rest for the above mentioned arms when in a horizontal position, said shoe being associated on the other hand with at least two projections of which one serves as a pusher member adapted to make said arm pass from its horizontal position into its vertical position when the inner section of the tower is raised and moves off a bearing surface while the other projection serves as a pusher member for the same arm with a view to shifting it from its vertical position to a horizontal position when the inner section of the tower is raised so as to reach a further bearing surface.

By reason of the necessity of shifting the inner section of the tower inside the outer section both upwardly and downwardly, one of the projections provided on the outer section of the tower and adapted to control the supporting arm is collapsible when said arm acts on it in a predetermined direction, to wit a downward direction.

The number of supporting arms on the inner section of the tower and also the number of bearing surfaces on the outer section and of all the other corresponding parts is of course irrelevant. Thus, in the case of a tower having a rectangular cross-section, a supporting arm and all the parts associated therewith are positioned in the vicinity of each corner of the tower.

My invention will be readily understood and its advantages and other features will appear clearly from the following description, reference being made to the accompanying diagrammatic drawings illustrating by way of example and in a nonlimiting sense a preferred embodiment of said automatic locking system as incorporated with a telescopic crane tower. In said drawings:

FIG. 1 is a perspective view of the cooperating ends of two telescopic sections of said tower, FIGS. 2, 3, 4 and 5 are highly diagrammatic elevational views showing various stages during which the inner section is shifted and held fast inside the outer section, FIG. 6 is, on a larger scale, a vertical sectional view of one of the projections controlling one of the supporting arms.

In said drawings, 2 designates the outer section and 3 the inner section of the tower.

In proximity with its upper end, the outer section 2 is provided with four inner bearing shoes or surfaces 4 arranged in one or more common horizontal planes while the upper end of said section 2 carries four projections 5 extending also in a same plane and facing each other pair-wise. Lastly, at a predetermined distance between the bearing surfaces 4 and the projections 5, the lower section 2 of the tower carries four other projections 6 also extending in a common horizontal plane and facing each other pairwise. Each of last mentioned projections 6 is designed in the manner illustrated in FIG. 6, in other words it is pivotally secured round a horizontal pivot 7 and is subjected to an upwardly directed tractional effort produced by a spring 8 urging constantly said projection 6 into engagement against the lower edge of a stationary casing 9.

As to the inner section 3 of the telescopic tower, it carries four lugs 12 serving pairwise as supports for two parallel shafts 13 carrying each at each end a supporting arm or bolt 14. Each arm 14 is rigid with a lateral projection 15.

Each shaft 13 is provided in its medial part with a bent section shown at 16, adapted to be engaged by one of the ends of the spring 17 of which the other end is secured to a stationary point 18. Above the four lugs 12 carrying the supporting arm 14, there are secured four stops 19.

In the position illustrated in FIGS. 1 and 2, the inner section 3 does not bear on the outer section 2 and is thus released with reference to the latter from the arms or bolts 14 extending vertically.

Figure 3:
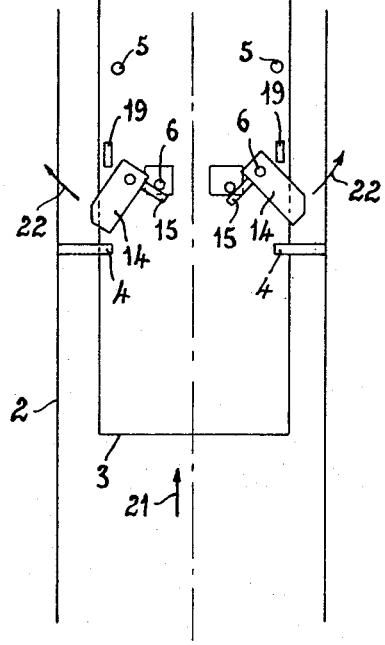

When the inner section 3 is shifted upwardly inside the outer section 2 as illustrated by the arrow 21 in FIG. 3, the arms or bolts 14 move freely between the bearing surfaces 4 and the projections 15 on the arms 14 engage each the corresponding projection 6 rigid with the outer section 2 of the tower. Consequently this leads to a rocking movement of the arms 14 in the direction of the arrows 22 of FIG. 3, the two shafts 13 rocking in the lugs 12 carying them. When said rocking movement of the arms 14 has reached a predetermined value, it continues automatically in the same direction under the action of the springs 17 on the bent sections 16 of the shafts 13, said movement being arrested when the four arms 14 engage the stops 19 rigid with the inner section 3.

Figure 4:
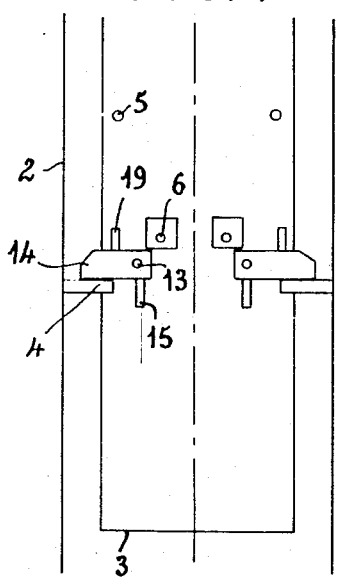

It is then sufficient to control the downward movement of the inner section 3 inside the outer section 2 so that the arms 14 which have thus reached a horizontal position sink and rest now on the bearing surfaces 4 rigid with the outer section 2 as illustrated in FIG. 4. For such a position, the two sections 2 and 3 of the tower rest on one another and are locked with reference to each other.

Figure 5:
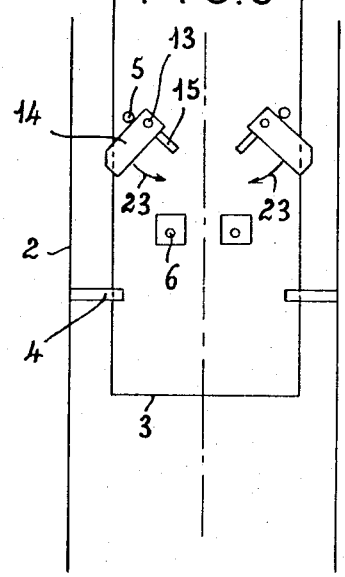

When it is desired to modify subsequently the height of the tower, it is sufficient to raise again the inner section 3 inside the outer section 2 as illustrated in FIG. 5, whereby the four arms 14 engage now the lower surfaces of the four stationary projections 5 and are thus caused to rock in the direction of the arrows 23 of FIG. 5; said movement continues in fact automatically until a vertical position is reached for the arms 14 as provided by the springs 17 as soon as the bent sections 16 of the shafts 13 carrying said arms 14 have reached a predetermined angular position.

The arms 14 being thus brought into a vertical position, the inner section 3 may rise or sink inside the outer section 2 without said arms 14 engaging the shoes or bearing surfaces 4. During said vertical movement, the lateral projections 15 on the arms 14 engage the upper surfaces of the projections 6 on the outer section 2 and produce a transient rocking movement of said projections 6 as illustrated in dot and dash lines in FIG. 6.

Consequently, it is possible to increase or reduce the height of the tower by a mere shifting of its inner section 3 inside the outer section 2, without any particular control of the locking and releasing arrangements being required. Each section may be subdivided into elementary disconnectable sections each provided with the auxiliaries disclosed hereinabove.

Obviously the present invention is by no means limited to the sole embodiment of a locking system which has been disclosed hereinabove by way of example and it covers all the modifications thereof falling within the scope of the accompanying claims.

What I claim is:

1. In combination with a tower including an upper inner and a lower outer telescopically interengaging superposed sections, the provision of a locking system comprising at least one supporting arm pivotally secured to the upper inner section round a horizontal axis, spring means secured to and acting between the interior of said inner section and a portion of said arm spaced from said axis, said spring being adapted to urge said supporting arm out of a sloping neutral position selectively into a vertical and into a horizontal position upon initiating shifting of said arm out of its neutral position towards said vertical and said horizontal position, stops rigid with said lower section and the lower surface of which is adapted to be engaged by the pivotal supporting arms when in a horizontal position, bearing shoes rigid with the outer lower section at least at one level, thereof in vertical registry with the supporting arms and adapted to be engaged by the latter and thereby hold the inner upper section in position in the outer lower section and projections rigid with the inner upper section at points located above each bearing shoe and adapted to shift the corresponding supporting arm respectively from its vertical position into its horizontal position upon raising of the inner upper section above the bearing shoe on which it rests and back from its horizontal position into its vertical position upon further raising of said inner upper section for further vertical movement.

2. In combination with a tower including an upper inner and a lower outer telescopically interengaging superposed sections, the provision of a locking system comprising at least one supporting arm pivotally secured to the upper inner section round a horizontal axis, spring means secured to and acting between the interior of said inner section and a portion of said arm spaced from said axis, said spring being adapted to urge said supporting arm out of a sloping neutral position selectively into a vertical and into a horizontal position upon initiating shifting of said arm out of its neutral position towards said vertical and said horizontal position, stops rigid with said lower section and the lower surface of which is adapted to be engaged by the pivotal supporting arms when in a horizontal position, bearing shoes rigid with the outer lower section at least at one level thereof, in vertical registry with the supporting arms and adapted to be engaged by the latter and thereby hold the inner upper section in position in the outer lower section and projections rigid with the inner upper sections at points located above each bearing shoe and adapted to shift the corresponding supporting arm respectively from its vertical position into its horizontal position upon raising of the inner upper section above the bearing shoe on which it rests and back from its horizontal position into its vertical position upon further raising of said inner upper section for further vertical movement, at least one of the two projections cooperating with each arm being adapted to collapse upon downward impact of said supporting arm on said projection.

3. In combination with a rectangular tower including an upper inner and a lower outer telescopically interengaging superposed sections, the provision of a locking system comprising a supporting arm pivotally secured to the upper inner section round a horizontal axis adjacent each corner of said section, spring means secured to and acting between the interior of said inner section and a portion of said arm spaced from said axis, said spring being adapted to urge said supporting arm out of a sloping neutral position selectively into a vertical and into a horizontal position upon initiating shifting of said arm out of its neutral position towards said vertical and said horizontal position, stops rigid with said lower section and the lower surface of which is adapted to be engaged by the pivotal supporting arms when in a horizontal position, bearing shoes rigid with the outer lower section, at least at one level thereof, in vertical registry with the supporting arms and adapted to be engaged by the latter and thereby hold the inner upper section in position in the outer lower section and projections rigid with the inner upper sections at points located above each bearing shoe and adapted to shift the corresponding supporting arm respectively from its vertical position into its horizontal position upon raising of the inner upper section above the bearing shoe on which it rests and back from its horizontal position into its vertical position upon further raising of said inner upper section for further vertical movement.

References Cited

UNITED STATES PATENTS

| | | | |
|---|---|---|---|
| 2,787,485 | 4/1957 | Frisell | 287—58 |
| 2,892,647 | 6/1959 | O'Neill | 287—58 |
| 3,312,487 | 4/1967 | McIntyre | 287—58 |

HENRY C. SUTHERLAND, *Primary Examiner.*